（12) United States Patent
McCormick

(10) Patent No.: US 7,964,852 B2
(45) Date of Patent: Jun. 21, 2011

(54) NEUTRON SENSITIVITY USING DETECTOR ARRAYS

(75) Inventor: Dan Jay McCormick, Hudson, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/562,166

(22) Filed: Sep. 18, 2009

(65) Prior Publication Data

US 2011/0068275 A1    Mar. 24, 2011

(51) Int. Cl.
 *G01T 3/00*   (2006.01)
(52) U.S. Cl. ...................................... 250/391
(58) Field of Classification Search .................. 250/391, 250/269.1–269.8, 385.1
See application file for complete search history.

(56) References Cited

U.S. PATENT DOCUMENTS

| | | | | |
|---|---|---|---|---|
| 3,666,950 | A | * | 5/1972 | Ferber et al. ............... 250/385.1 |
| 3,930,162 | A | * | 12/1975 | Reiss ......................... 250/385.1 |
| 4,420,689 | A | * | 12/1983 | Rogers et al. ............. 250/385.1 |
| 6,426,504 | B1 | | 7/2002 | Menlove et al. |
| 7,002,159 | B2 | | 2/2006 | Lacy |
| 2003/0150999 | A1 | * | 8/2003 | Buffet et al. .............. 250/385.1 |

OTHER PUBLICATIONS

Bellinger, S.L., W.J. McNeil, D.S. McGregor,209, "Improved Fabrication Technique for Microstructured Solid-State Neutron Detectors," S.M.A.R.T. Laboratory, Mechanical and Nuclear Engineering Dept., Kansas State University, Manhattan, KS 66506.
McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.
McNeil, W.J., Bellinger, S.L., Unruh, T.C., Henderson, C.M., Ugorowski, P., et al. 2009, "1-D Array of Perforated Diode Neutron Detectors," Nuclear Instruments and Methods in Physics Research A, 604, pp. 127-129.
Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.
Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

* cited by examiner

*Primary Examiner* — David P Porta
*Assistant Examiner* — Kiho Kim
(74) *Attorney, Agent, or Firm* — Pearne & Gordon LLP

(57) ABSTRACT

A detector array includes a plurality of neutron detectors. Each neutron detector includes an anode and a cathode including at least some B-10 boron. The array includes at least one gamma detector engaged against at least one neutron detector within the array. A detector array includes a plurality of detectors engaged against each other. The plurality of detectors includes at least one neutron detector and at least one gamma detector. In one specific example, the at least one neutron detector contains B-10. An associated method adjusts information concerning a value of neutron detection.

10 Claims, 3 Drawing Sheets

NEUTRON SENSITIVITY USING DETECTOR ARRAYS

BACKGROUND OF THE INVENTION

1. Field of the Invention

The invention relates to neutron detector arrays, and specifically relates to detector arrays having a mix of detectors with and without a coating of neutron sensitive material.

2. Discussion of Prior Art

Recently, high sensitivity neutron detectors for homeland security has become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing for the moment upon the physical construction of neutron detectors and neutron detector arrangements, a neutron detector includes an anode and a cathode. One example detector includes a wire extending on an axis for the anode and a cylindrical cathode circumscribing the anode. Often, detector arrangements are configured to have a large number of individual detection pairs (i.e., a single cathode and a single anode) for high sensitivity. Also, logically, using plural detectors permits detection over a greater area that might be possible upon using just a single detector. For example, a single detector (i.e., a single anode and a single cathode) has a practical limitation on overall size.

Focusing upon boron, the majority (e.g., approximately 80%) of available boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

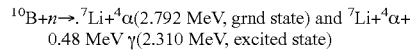

$^{10}$B+$n$→.$^{7}$Li+$^{4}$α(2.792 MeV, grnd state) and $^{7}$Li+$^{4}$α+ 0.48 MeV γ(2.310 MeV, excited state)

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle (α) and a lithium nucleus ($^{7}$Li) are emitted isotropically from the point of neutron capture by B-10 in exactly opposite directions and, in the case of the dominant excited state, with kinetic energies of 1.47 MeV and 0.84 MeV, respectively.

Turning back to physical construction of neutron detector arrangements, within a He-3 detector arrangement, each detection pair is often relatively small since the sensitivity is relatively high. This allows good resolution (i.e., the ability to discriminate neutron trajectory determination). A new generation of neutron detectors would be most beneficial if the new generation detectors provided a similar level of resolution as existing He-3 detectors without significant change to overall dimensions of the detectors. Another way of considering this idea is that the new generation of detectors must be physically similar to existing detectors so they can be easily retrofitted and must have comparable position sensitivity as a He-3 detector.

As mentioned, the use of B-10 for neutron detection is known. However, the use of B-10 in known sensor configurations (i.e., plated onto the cathode structure of known sensors) is associated with insufficient sensitivity. Specifically, B-10 coating on the cathode structure is relatively thin and such detectors achieve only a few percent efficiency, due to the fact that the thicknesses needed for a substantial capture of neutrons exceeds the escape range of the neutron capture reaction products. In one example, the optimal thickness of a B-10 coating is based upon 0.4 mg/cm$^2$. So in many instances, capture reaction products can not escape. Only conversions of neutrons in a very thin layer near the surface of the B-10 adjacent the counting gas are detected efficiently. Since this very thin, top layer of the B-10 coating captures only a very small percentage of the incident neutrons, efficiency of a neutron detector of such simple design is understandably low.

A new generation of neutron detectors would be most beneficial if the new generation provided a similar level of neutron sensitivity without significant change to overall dimensions of the detectors. One aspect to consider for B-10 use within such a new generation of neutron detectors is an associated detection of gamma rays, which could be misidentified as detection of neutrons. Such a new generation of neutron detectors would be most beneficial and advantageous to also provide for discrimination of gamma rays.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a detector array that includes a plurality of neutron detectors. Each neutron detector includes an anode and a cathode. The array includes at least one gamma detector engaged against at least one neutron detector within the array. In one specific example of the one aspect, the cathode includes at least some B-10 boron.

Another aspect of the invention provides a detector array that includes a plurality of detectors engaged against each other. The plurality of detectors includes at least one neutron detector and at least one gamma detector. In one specific example of the other aspect, the at least one neutron detector contains B-10 boron.

Another aspect of the invention provides a method of detecting neutrons using a detector array, the array including a plurality of neutron detectors, wherein each neutron detector includes an anode and a cathode, and at least one gamma detector engaged against at least one neutron detector within the array. The method includes the steps of each neutron detector providing information concerning a value of neutron detection, the gamma detector providing information concerning a value of gamma detection, and the information concerning a value of gamma is used to adjust the information concerning a value of neutron detection. In one specific example of this aspect, the cathode includes at least some B-10 boron.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
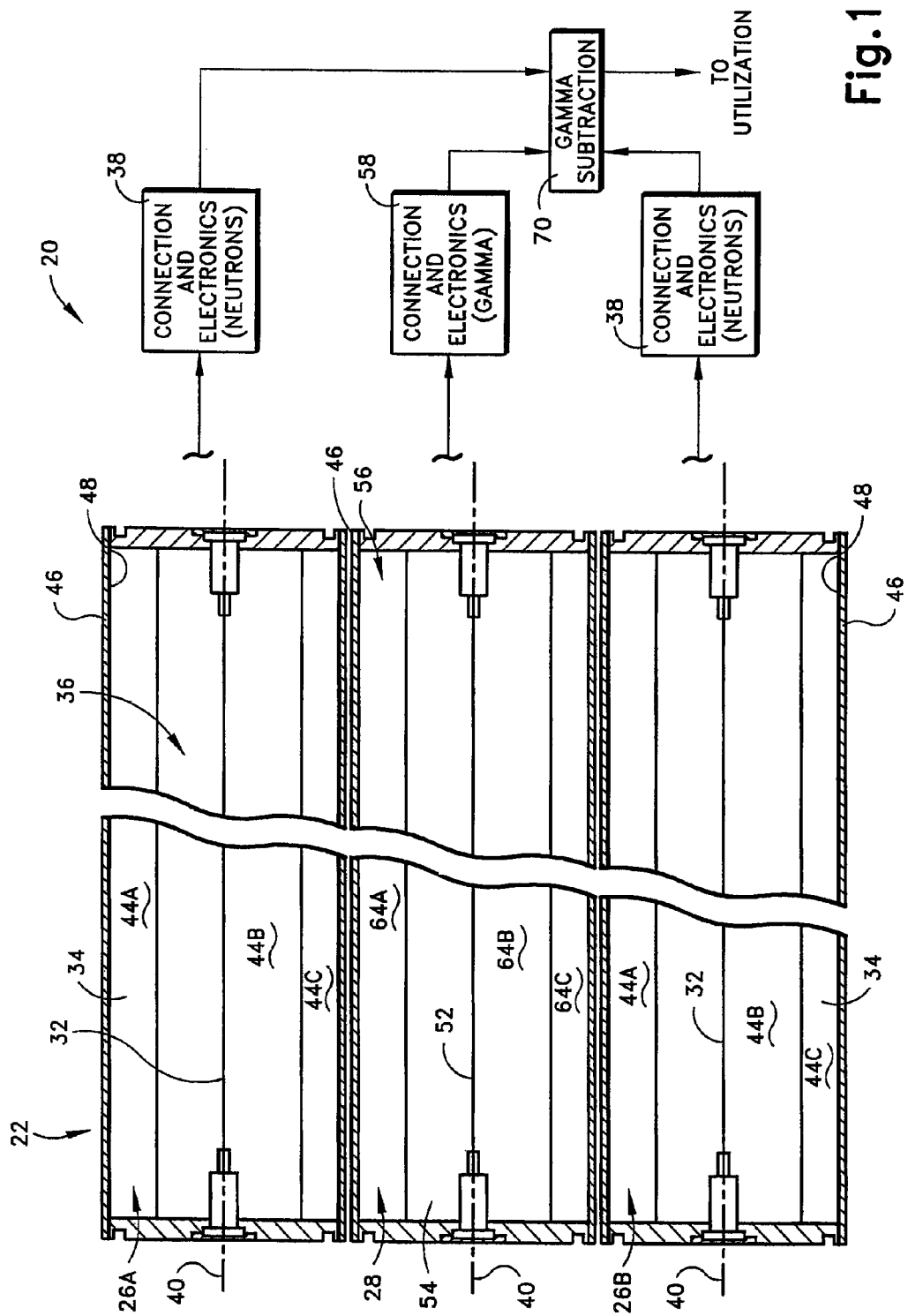
FIG. 1 is a schematic cross-section of an example neutron detector array in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Neutron detection may have an added challenge in that gamma radiation may cause a result that could be misidentified as being caused by neutrons. One aspect of the invention is to provide an ability to properly identify a result caused by gamma radiation and thus to help improve precision concerning neutron detection. An example embodiment of a neutron detector arrangement 20 that includes a detector array 22 according to the one aspect of the invention is shown in FIG. 1.

The example array of FIG. 1 includes two neutron detectors 26A, 26B and one gamma detector 28. This simple example thus shows a basic example of mixing neutron and gamma detectors. Focusing upon the neutron detectors 26A, 26B, each neutron detector includes a pair of electrodes, which are an anode 32 and a cathode 34. The anode 32 and cathode 34 are separated from each other within a volume 36. In the shown example the cathode 34 provides part of the outer boundary of the volume 36. The volume 36 is sealed and contains a gas, such as argon and carbon-dioxide.

The anode 32 is electrically conductive and electrically connected to an associated electronics arrangement 38 (shown schematically within FIG. 1) as will be appreciated by the person of skill in the art. In the shown example, the anode 32 is elongate and extends along an axis 40 of the neutron detector (e.g., 26A) and the cathode 34 extends about the anode and the axis. In one example, the anode 32 is a wire that is in the range of 0.0254-0.0508 mm (0.001-0.002 inches) in diameter. As mentioned, such a size range is merely an example. Accordingly, such an example should not be considered to be a limitation upon the invention.

In the shown example, the cathode has six flat sides (only three visible due to the section, 44A-44C) that are a supporting substrate 46 and a coating layer 48 of a neutron sensitive boron material is on the substrate (note that in FIG. 1 a thickened line is provided to represent the coating layer 48). In one example, the supporting substrate 46 is metal and the neutron sensitive material is boron that is enriched to have a high content of B-10. One example of a high content of B-10 is a content of B-10 greater than 90%. It is to be appreciated that other neutron sensitive material (e.g., other Boron components or even He-3) may be used within the cathode 34 of the gamma detector 28. Microscopic surface enhancement features can be provided upon any or all of the surfaces of the cathode(s). The microscopic surface enhancement features provide for additional surface density and thus provide for increased boron surface area. The coating layer 48 of the cathode 34 faces (i.e., is exposed to) the anode 32. As such, the coating layer 48 is an interior face of the cathode 34 which contains boron (B-10). Another way of presenting this is that the cathode 34 has an interior face that includes the boron. The cathode 34 is electrically conductive and electrically connected to the electronics arrangement 38 as will be appreciated by the person of skill in the art.

Sensing a neutron is accomplished by a current pulse that occurs between the anode 32 and cathode 34, through the gas, when a neutron impinges upon the B-10 boron of the cathode. When a neutron is absorbed by a B-10 atom in the coating layer 48 on the cathode 34, an alpha particle (i.e., a helium-4 nucleus) and lithium-7 nucleus—both positively charged—are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume 36, it ionizes the gas. The negative ion particles, electrons, drift towards the anode 32 and as the negatively charged particles approach sufficiently near the anode (e.g., within 1-3 anode diameters) the negatively charge particles accelerate to the point of generating even more charge. This is called "gas gain" and it generates enough charge so that the resulting current has a perceptible effect within the associated electronics arrangement 38 operatively connected to the neutron detector (e.g., 26A). Thus, the current at the anode 32 is detectable and quantifiable. The electronics arrangement 38 outputs a signal indicative of detection. In one respect the indicative signal provides a value (i.e., information) of the amount of detected neutron events. It is to be appreciated that in one example, the associated electronics arrangement 38 includes an electronic amplifier in order to aid in processing the current generated at the anode 32. It is to be appreciated that general operation/structure of neutron detectors and associated electronics arrangements will be appreciated by the person of skill in the art.

Focusing upon the gamma detector 28, the gamma detector is similar to the neutron detectors 26A, 26B. The gamma detector 28 includes a pair of electrodes, which are an anode 52 and a cathode 54. The anode 52 and cathode 54 are separated from each other within a volume 56. In the shown example the cathode 54 provides part of the outer boundary of the volume 56. The volume 56 is sealed and contains a gas, such as argon and carbon-dioxide. The volumes 36 and 56, and thus the gas therein, may interconnected. The anode 52 is electrically conductive and electrically connected to an electronics arrangement 58 (shown schematically within FIG. 1) as will be appreciated by the person of skill in the art. In the shown example, the anode 52 is substantially similar to the anodes 32 within the neutron detectors 26A, 26B. In the shown example, the cathode has six flat sides (only three, 64A-64C, visible due to the section). The cathode 54 has a substrate 46, but does not include a layer of a neutron sensitive boron material on the substrate (note that in FIG. 1 a thickened line is not provided). In one example, the substrate 46 is metal and is electrically connected to the electronics arrangement 38 as will be appreciated by the person of skill in the art.

The gamma ray interacts with the metal substrate 46 and generates electrons which enter the gas. These electrons then generate a pulse at the anode 52. The associated electronics arrangement 58 is operatively connected to the gamma detector 28. Thus, the current at the anode 52 is detectable and quantifiable. The electronics arrangement 58 outputs a signal indicative of detection (i.e., information). In one respect the indicative signal provides a value of the amount of detected gamma events. It is to be appreciated that in one example, the associated electronics arrangement 58 includes an electronic amplifier in order to aid in processing the current generated at the anode. It is to be appreciated that general operation/structure of neutron detectors and associated electronics arrangements will be appreciated by the person of skill in the art.

It is to be noted, that gamma ray interaction will occur in both the neutron detectors 26A, 26B and the gamma detector 28. In the neutron detectors 26A, 26B, the gamma interacts with the respective metal substrate 46 beneath the coating layer 48 and generates electrons which enter the gas. These electrons can then generate a pulse at the respective anode 32. For gamma-caused pulse within one of the neutron detectors (e.g., 26A), the pulse may appear to be a pulse caused by neutron interaction. The pulse is similar to a pulse caused by a neutron except it has a lower energy, so the pulse height is generally lower than a neutron event. However when a neutron hits a boron atom the energetic charged partials may deposit all or only some of their energy in the gas, since it may hit the other side of the detector before stopping. So even a neutron-caused pulse may have variation in the pulse height. This distribution of pulse heights can result in a peak that is not well defined. So at the neutron detectors 26A and 26B, some neutron events may appear to be gamma events and vice versa. Accordingly, the signal from the electronics arrangement 38 may have a value that is somewhat imprecise as an indication of neutrons.

One aspect of the present invention is to use detection of gamma via the gamma detector 28 to provide a value of gamma events that can be used (e.g., subtracted) to modify the neutron event value to improve precision.

The example arrangement 20 includes a gamma subtraction portion 70 operatively connected to the electronics arrangements 38 for the neutron detectors 26A, 26B and the electronics arrangement 58 for the gamma detector 28. In one example, it can be considered that gamma events are occurring with equal frequency within each detector (neutron and gamma) 26A, 26B and 28. As such, in the shown example, the determined gamma value is utilized to subtract an amount from the values associated with the neutron detectors 26A, 26B. Thus, the expectation is that a more precise value of neutron events is the result. It is to be appreciated that the presented example is one example means for utilizing information derived from the gamma detector 28 to modify information from neutron detectors. The construction and configuration of the gamma subtraction portion 70 could vary and may contain a comparator circuit, a digital processor or other means to determine a difference in values and reduce a value amount based upon the difference determination. It is to be appreciated that the gamma subtraction portion 70 is operatively connected so that the adjusted Neutron information may be utilized. The operative connection may be to any suitable component, device, etc. and is schematically shown by the arrowhead leading away from the gamma subtraction portion 70.

It should be realized that the array 22 of FIG. 1 is just one example of detector mixing and that the example is somewhat basic since only a few detectors 26A, 26B and 28 are within the array. The basic example provides for ease of understanding of the one aspect of the present invention. Of course, it is to be appreciated that such a basic example with just a few detectors need not be a limitation upon the present invention.

Figure 2:
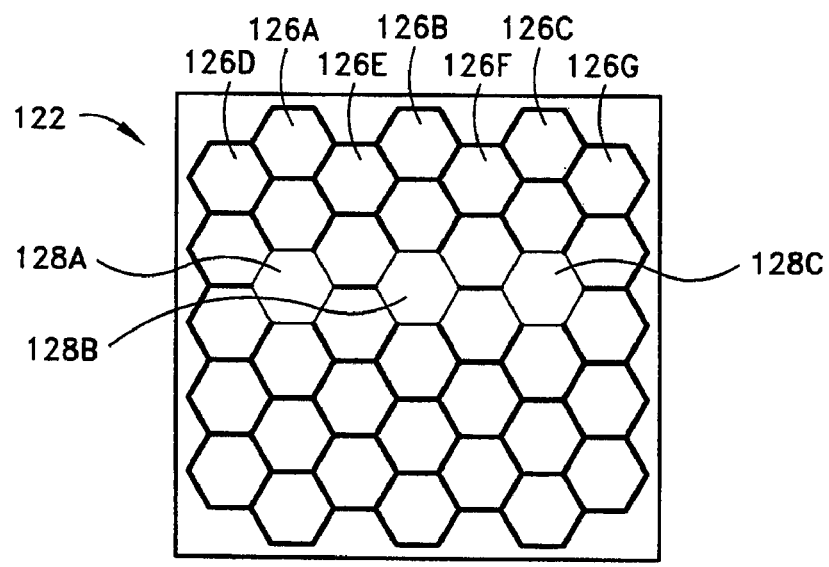
FIG. 2 is an example configuration layout for a neutron detector array in accordance with another aspect of the invention and having a larger number of detectors compared to FIG. 1.

With the understanding that the presented examples herein are not to be limitations on the invention, attention is directed to the schematically represented example of FIG. 2. In the shown example thirty-eight detectors are provided within an array 122. Of the thirty-eight detectors, thirty-five are neutron detectors 126A, etc. and three are gamma detectors 128A-128C. Within the schematic representation the thicker lines represent shared walls that have coating layers on both sides and the thinner lines represent shared walls that have coating layers on just a single side. Logically, the locations with the coating are for neutron detectors 126A, etc. and the locations without the coating are for the gamma detectors 128A-128C. The gamma values detected at the three gamma detectors 128A-128C are to be utilized to improve the precision of the indication of the neutron event values from the neutron detectors. As mentioned earlier, one approach is to use a subtraction operation.

It is worth noting that the adjacent locations of the detectors 126A, etc. and 128A, etc. are contiguous and gapless in the array 122. Another aspect is that the detectors 126A, etc. and 128A, etc. touch each other. Still another aspect is that the detectors nest into each other to share walls. Such feature(s) can provide, in part, some level of ability that all of the detectors (both neutron and gamma) will experience gamma events equally. Also, space efficiency is provided.

Figure 3:
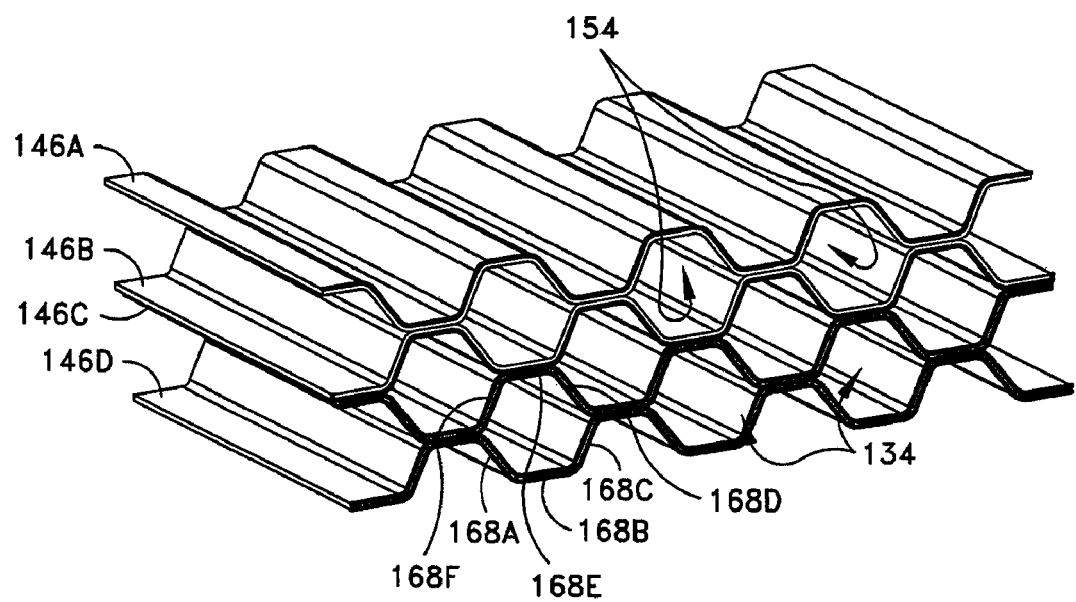
FIG. 3 is a perspective view of four formed sheets of material used to provide cathode substrates of multiple, adjacent detectors as one example that can be used to form an array configured such as shown within FIG. 2.
Figure 4:
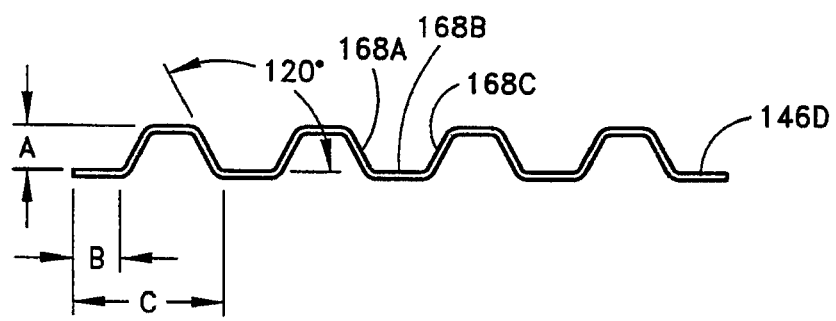
FIG. 4 is an end view of one of the sheets of FIG. 3 and shows example shape configurations and dimensions.

The multi detector array of FIG. 2 may be constructed in various ways using various methodologies. One example methodology in accordance with another aspect of the invention will be appreciated upon viewing FIGS. 3-5. Specifically, FIG. 3 shows four sheets 146A-146D of undulated substrate material that are placed together to provide multiple tube segments that each have six planar segments 168A-168F. FIG. 4 is an end view of one of the example sheets (e.g., 146D) of undulated supporting substrate material. The undulations are not smooth and sinusoidal. Instead, each undulation is made by flat segments (e.g., 168A-168C) orientated (e.g., bent or formed) at a 120° to each adjacent flat segment. Dimensions for the example sheet (e.g., 146D) are identified as A, B and C. In one specific example, A=0.16 inch (4.064 mm), B=0.15 inch (3.81 mm) and C=0.5 inch (12.7 mm). Of course, such orientations and/or dimensions are for only one example and other dimensions may be used, and as such the example is not a required limitation upon the invention.

It is to be noted that first substrate sheet material 146A is only coated on the top face of the substrate sheet material and is not coated on the bottom face of the substrate sheet material. Also, the second substrate sheet 146B is only coated on the bottom and is not coated on the top. The third and fourth sheets 146C and 146D are coated on both the top and bottom. With the sheets 146A-146D stacked as shown in FIG. 3, seven complete neutron cathodes 134 are provided and three complete gamma (no coating layer) cathodes 154 are provided. Of course, the example of FIG. 3 is based upon an approach that complete sides of a substrate sheet material are either coated or uncoated. It is contemplated that partially coated and partially uncoated sheet sides could be utilized to provide for individual placement of neutron and/or gamma detectors within an array.

Figure 5:
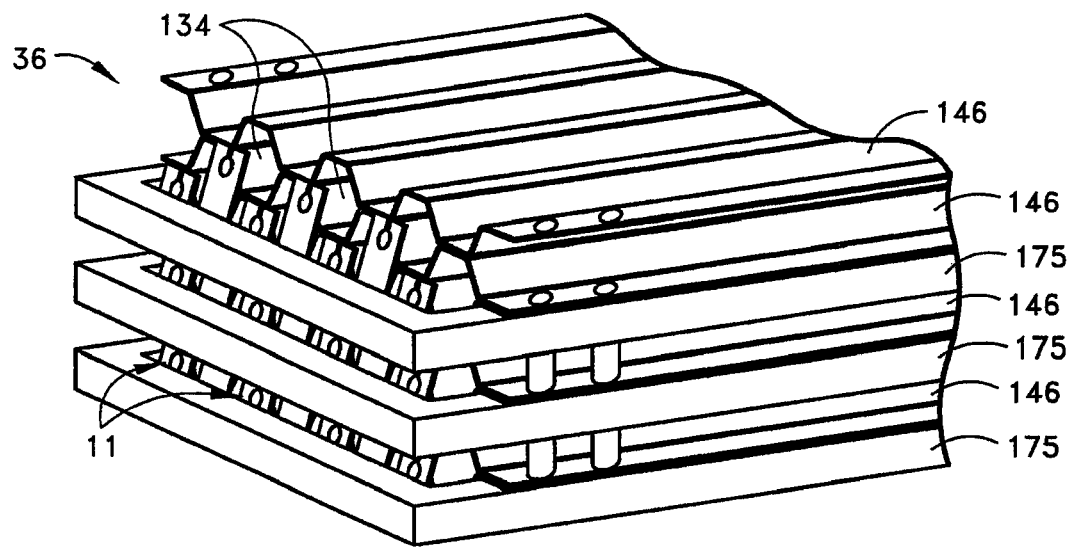
FIG. 5 is a perspective view of multiple detectors being assembled in accordance to the example utilizing sheets shown in FIG. 3.

Turing now to FIG. 5, it is to be appreciated that upon stacking additional sheets (generically identified as 146) of the substrate material, each with desired coating or non-coating, additional cathodes are created upon each sheet addition. The example of FIG. 5 shows that twenty-one cathodes have been created. It is to be appreciated that the cathodes are not identified as being for neutron or gamma detection, but are left generic. It is to be appreciated that any desired pattern of neutron and gamma detector intermixing can be done, with the pattern being dependent upon location of coating/non-coating.

The cathodes fit together to provide the honeycomb configuration. It is worth noting that it is possible that some segment(s) of the undulated substrate material sheets 146 may not be part of a complete cathode. It is contemplated that as part of the methodology to coat neutron sensitive material onto some/part of undulated substrate material sheets, the neutron sensitive material not be coated onto the segment(s) of the undulated substrate material sheet that will not be part of a complete cathode. This would help prevent neutron interaction with neutron sensitive material that is not part of a complete neutron detector.

Aside from providing the arrangement of cathodes via the stacking of sheets of the substrate material 146, some other structural features of the detector array are provided, but may not be limitations upon the invention. For example, FIG. 5 shows support structures 175 for supporting an array of anode wires (not shown in FIG. 5 to avoid drawing clutter). Each anode wire is supported to extend along the central axis of a respective cathode, similar to the anode wire location as shown in FIG. 1. In the shown example, the support structures 175 each include a surrounding bracket that in turn support extending tabs that hold the anode wires.

It is to be appreciated that other shapes (e.g., other multi-sided shapes) could be used for the cathodes and thus the detectors. The use of other shapes would still permit the intermixing of neutron and gamma detectors within an array.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A detector array including:
    a plurality of neutron detectors, wherein each neutron detector including:
        an anode; and
        a cathode including a layer of neutron sensitive boron material;
    a plurality of gamma detectors engaged against neutron detectors within the array, wherein each gamma detector including:
        an anode; and
        a cathode that does not include a layer of neutron sensitive boron material;
    a plurality of stacked, undulated substrate sheets having plural sides and extending at spaced distances from anode axes within the array with the sheets and providing cathode substrates, each pair of adjacent sheets bounding a series of volumes for detectors with anodes extending within the volumes at the anode axes and along the plural sides of the substrate sheets, and the substrate sheets having the layer of neutron sensitive boron material on at least some sides to provide neutron detector cathodes and the substrate sheets not having a layer of neutron sensitive boron material on at least some sides to provide gamma detector cathodes.

2. A detector array as set forth in claim 1, wherein the layer of neutron sensitive boron material on at least some sides of the substrate sheets to provide neutron detector cathodes includes at least some B-10 boron.

3. A detector array as set forth in claim 1, wherein the cathodes of the gamma detectors are devoid of B-10 boron.

4. A detector array as set forth in claim 1, wherein for each detector in the array the cathode has a plurality of planar segments facing the anode.

5. A detector array as set forth in claim 4, wherein for each detector in the arrays some of the planar segments of the cathodes have substrates shared with adjacent cathodes, with the sharing being via two opposite faces of substrate sheets.

6. A detector array as set forth in claim 1, wherein for each detector in the array each cathode has six planar segments.

7. A detector array as set forth in claim 6, wherein the array has a honeycomb configuration, and the planar segments of the cathodes extend such that the honeycomb configuration is contiguous and gapless.

8. A detector array as set forth in claim 1, wherein the plurality of neutron detectors provide information and the plurality of gamma detector provide information, and the array further including means for utilizing information derived from the gamma detectors to modify information from the neutron detectors.

9. A method of detecting neutrons using a detector array, the detector array including a plurality of neutron detectors, wherein each neutron detector including an anode, and a cathode including a layer of neutron sensitive boron material, the array also including a plurality of gamma detectors engaged against neutron detectors within the array, wherein each gamma detector including an anode, and a cathode that does not include a layer of neutron sensitive boron material, the array still further including a plurality of stacked, undulated substrate sheets having plural sides and extending at spaced distances from anode axes within the array with the sheets and providing cathode substrates, each pair of adjacent sheets bounding a series of volumes for detectors with anodes extending within the volumes at the anode axes and along the plural sides of the substrate sheets, and the substrate sheets having the layer of neutron sensitive boron material on at least some sides to provide neutron detector cathodes and the substrate sheets not having a layer of neutron sensitive boron material on at least some sides to provide gamma detector cathodes, wherein the method includes the steps of each neutron detector providing information concerning a value of neutron detection, each gamma detector providing information concerning a value of gamma detection, and the information concerning gamma detection is used to adjust the information concerning neutron detection.

10. A method as set forth in claim 9, wherein at least one cathode of the plurality of neutron detectors includes at least some B-10 boron.

* * * * *